United States Patent [19]
Jones

[11] 3,795,227
[45] Mar. 5, 1974

[54] ROTARY COMBUSTION ENGINE WITH IMPROVED FIRING SYSTEM

[75] Inventor: Charles Jones, Hillsdale, N.J.

[73] Assignee: Curtis-Wright Corporation, Wood-Ridge, N.J.

[22] Filed: Oct. 24, 1972

[21] Appl. No.: 299,811

[52] U.S. Cl. .............................. 123/8.09, 123/8.45
[51] Int. Cl. ...................... F02b 53/10, F02b 53/12
[58] Field of Search ....... 123/8.09, 8.45; 60/39.82 S

[56] References Cited
UNITED STATES PATENTS

| | | | |
|---|---|---|---|
| 3,057,149 | 10/1962 | Leinweber | 60/39.82 S |
| 3,057,159 | 10/1962 | Benedict | 60/39.82 S |
| 3,508,530 | 4/1970 | Clawson | 123/8.09 UX |
| 3,696,796 | 10/1972 | Gavrun | 123/8.09 X |
| 3,698,364 | 10/1972 | Jones | 123/8.09 |

Primary Examiner—Clarence R. Gordon
Attorney, Agent, or Firm—Raymond P. Wallace

[57] ABSTRACT

A rotary engine with fuel injection into the combustion chamber, wherein the positive electrode of the spark plug strikes a spark directly to the injector nozzle as the negative electrode during the period of fuel injection, thus producing positive ignition even during very lean operation, and also reducing spark plug fouling.

10 Claims, 9 Drawing Figures

ROTARY COMBUSTION ENGINE WITH IMPROVED FIRING SYSTEM

BACKGROUND OF THE INVENTION

This invention relates to rotary combustion engines of trochoidal type, and more particularly to the means of firing fuel injected into the combustion chamber.

Rotary engines are known in which a fuel injector and a spark plug in close proximity to each other are positioned in a recess in the peripheral housing. Such an engine is shown in U.S. Pat. No. 3,246,636, wherein the fuel injector discharges fuel into the combustion chamber in either the upstream or downstream direction of rotor travel. The injector nozzle provides a spray of fuel, and the cone of the spray is so oriented that the outer periphery of the cone clears the negative electrode at the base of the spark plug. The positive electrode being still farther outside the spray cone, the fuel does not actually pass through the path of the spark.

Such an arrangement is necessary because if the electrodes projected into the spray it would disrupt the desired spray pattern. With this positioning of the spray nozzle and the spark plug, sparking takes place at a little distance from the cone of liquid fuel entering the combustion chamber. At low levels of engine operation, and particularly at idling speeds when there is relatively little turbulence of the air compressed in the chamber, there is apt to be very little mixing of fuel with air just at the point where the spark occurs. With such lack of fuel vaporization, ignition may be uncertain and missing may result. Fouling of the plug may also occur, owing to partial combustion and deposition of partially burned fuel products on the electrodes.

Other characteristics of the invention of the patent are that the spray cone travels only in the direction of the orientation of the injector, with a relatively small spread in the neighborhood of thirty degrees or less. Since it is desirable that the jet achieve at least some spread before passing the spark plug electrode, it is necessary that the injector nozzle be disposed at a relatively great distance from the inner surface of the wall of the combustion chamber, that is, the nozzle must be deep in its cavity. The configuration of the two-electrode spark plug also requires that it be relatively deep in its cavity, thus adding to the total cavity volume. A cavity of large volume is undesirable since it has an effect on the compression ratio, it requires that a considerable quantity of the compressed air be diverted into it if vaporization is to take place, and it is in any case a relatively cold area where vaporization is more difficult. More importantly, the required spread of the spray before reaching the aperture in the combustion chamber wall requires that the aperture be large enough to accommodate it. The combination of a large cavity and a large aperture provides a considerable leakage path across the leading apex seal of the compression chamber as it crosses the aperture, allowing a good deal of leakage of compressed air into the preceding chamber which is then approaching its full expansion volume.

SUMMARY

The present invention overcomes the foregoing difficulties by providing a fuel-injected rotary engine with an igniting arrangement wherein the spark plug has the positive electrode protruding from the nose in close proximity to the injector nozzle, and the nozzle serves as the negative electrode with the spark striking directly through a portion of the fuel spray. This insures reliable firing even at low idling speed, since the heat of the spark vaporizes the fuel through which it passes. Since combustion is initiated right at the electrodes, they are maintained in a hotter condition and products of partial combustion do not deposit on them, reducing the possibility of fouling.

The injector nozzle discharges through a plurality of orifices with a total spread approaching 180°, and this characteristic, with the configuration of the single electrode spark plug and the use of the fuel nozzle as the other electrode, in addition to providing better fuel distribution in the combustion chamber, allows the positioning of the nozzle within a few thousandths of an inch from the inner wall surface of the combustion chamber, thus reducing the cavity volume and requiring only a very small aperture into the combustion chamber.

It is an object of this invention to provide a fuel-injected rotary engine with an improved firing system.

It is another object to provide such an engine with means of striking a spark through a portion of the fuel spray.

A further object is to provide a fuel-injected rotary engine with non-fouling firing means.

Other objects and advantages will become apparent on reading the following specification in connection with the accompanying drawings.

DESCRIPTION OF THE PREFERRED EMBODIMENTS

Figure 1:
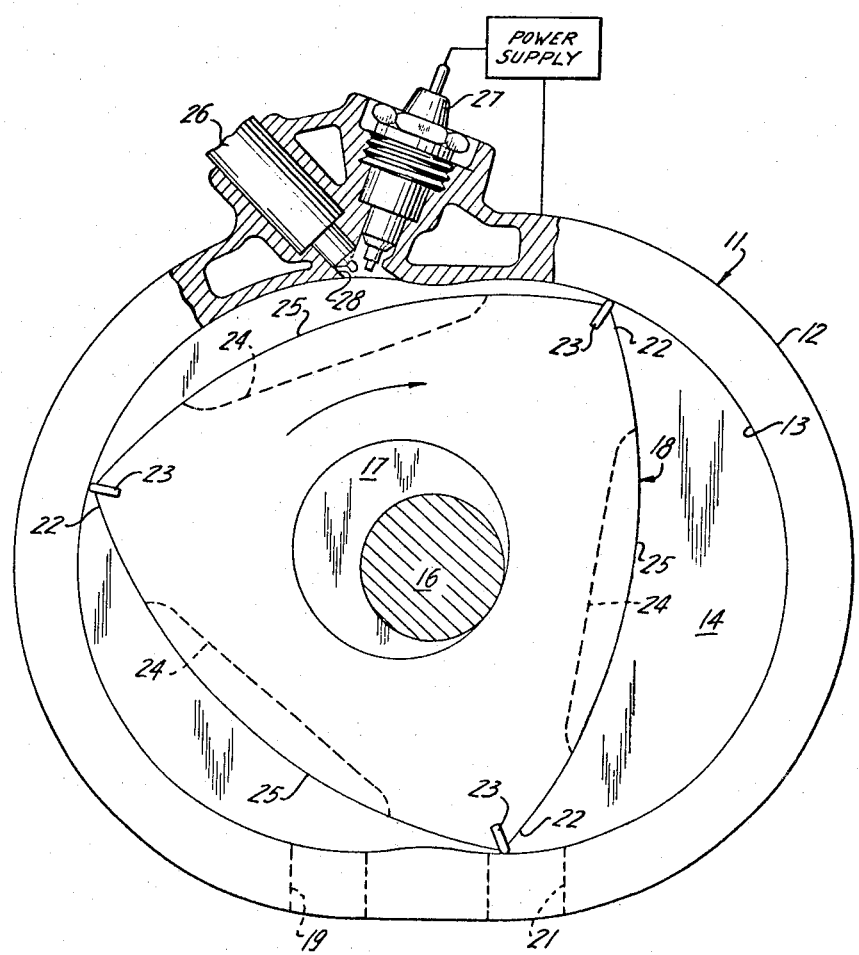
FIG. 1 is an end view, partially in section, of a two-lobed trochoidal rotary engine with one end wall removed.

In FIG. 1 there is shown a view of an engine 11 in the axial direction, embodying a peripheral housing 12 having a two-lobed basically epitrochoidal inner surface 13, parallel end walls 14 of which only the rearmost is shown, a shaft 16 transpiercing the end walls and having an eccentric portion 17 disposed within the engine cavity, and a generally polygonal rotor 18 rotatably mounted on the eccentric. The rotor shown has a generally triangular profile with convex arcuate sides, which configuration is substantially the inner envelope of the two-lobed epitrochoidal housing shown. For other two-lobed epitrochoids the inner envelope, while remaining generally triangular, will vary somewhat in profile. For epitrochoids having a different number of lobes, the inner envelope will also be generally polygonal and will have one more apex portion than the number of lobes in the epitrochoid.

The engine housing is provided with an intake port 19 for intake of fresh air by rotation of the rotor, and an exhaust port 21. Either or both of the ports may be disposed in the peripheral housing as shown, or in either or both of the end walls, but in any case they will be in the region of a cusp of the epitrochoid formed by the junction of the lobes, and spaced apart by the cusp. Each of the rotor apex portions 22 is provided with an apex seal strip 23 sweeping the inner surface 13 in sealing relationship. Various other sealing elements, bearings, and other appurtenances of such an engine are understood to be present, but not shown here as not being immediately germane to a description of the present invention.

Chambers of variable volume are formed between the housing and each of the three rotor flanks or working faces 25. On rotation of the rotor, fresh air is taken in through port 19 and compressed in the zone of the opposite cusp. Each of the rotor working faces 25 is provided with a recess 24 which assists in determining the compression ratio of the engine, and transfers the gases across the cusp at the junction of the epitrochoidal lobes. The shape of recess 24 and its position in the rotor face 25 may vary according to the design of the engine. The rotor is shown approximately at the firing position, that is, in the neighborhood of 30° of shaft angle before reaching full compression at top dead center.

A fuel injection nozzle 26 and a spark plug 27 (better shown in FIGS. 2 and 3) are positioned in intercommunicating recesses in the peripheral wall 12 at the region of the cusp in the compression zone, opposite the intake and exhaust ports, the injector and spark plug recesses intercommunicating at their inner ends and having a common aperture 28 opening to the engine cavity. The injector and spark plug are disposed at an angle to each other so as to bring the nozzle 29 and the electrode 31 into close proximity at the aperture 28. As shown, the nozzle and spark plug are positioned somewhat to the upstream side of the cusp, with the fuel spray discharging through aperture 28. However, for certain types of engine operation or with different shapes of the rotor recesses 24, the injector and spark plug assembly may be at other locations in the cusp region, such as somewhat downstream from the cusp, or at the cusp itself. An appropriate power supply, being the ignition system of the engine, has one pole connected to the electrode of the spark plug, the remainder of the engine being at ground with respect to the potential supplied to the plug.

Figure 2:
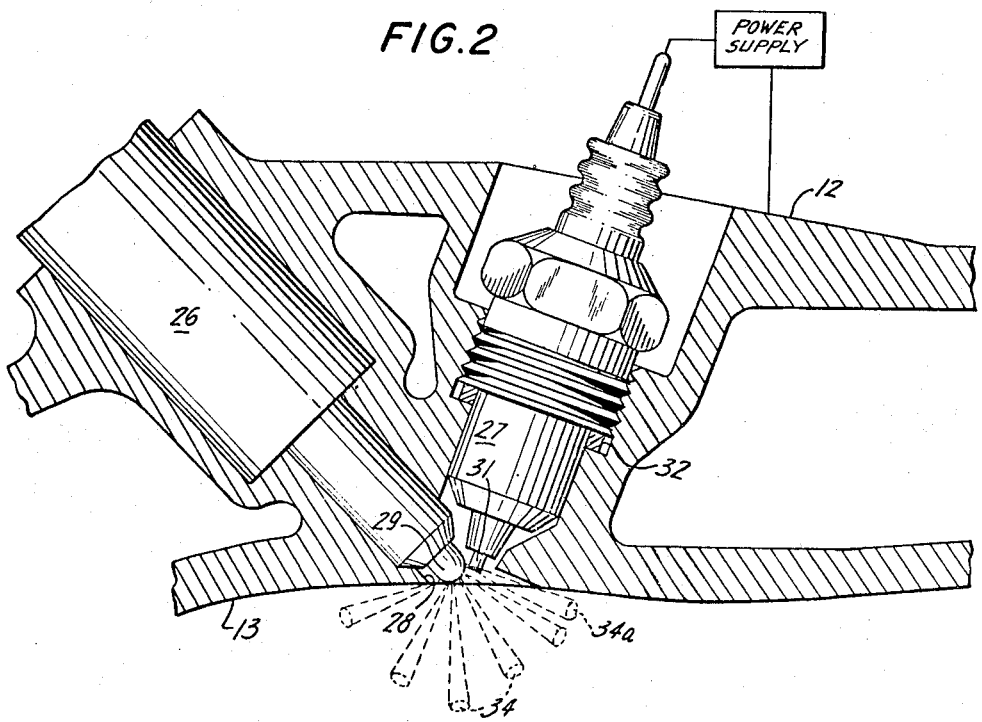
FIG. 2 is a large scale fragmentary view showing one embodiment of the fuel injector and spark plug.

As shown on an enlarged scale in FIG. 2, the injector 26 has an apertured spray nozzle 29 disposed at the housing aperture 28 and as close as possible to the housing inner surface 13; the nozzle is substantially tangent to the inner surface, or at most a few thousandths of an inch removed. The positioning of the spark plug 27 with its axis angularly disposed to the axis of the injector brings the electrode 31 of the plug in close proximity to the spray nozzle 29. The exact distance separating the electrode from the nozzle is governed by screwing the plug down to a predetermined torque against a gasket 32 positioned against a seat in the spark plug cavity. The distance then separating the electrode and the nozzle is the optimum gap for spark ignition, the spray nozzle being grounded through its mounting to the negative side of the ignition system.

This arrangement whereby the nozzle can be placed tangent to the housing inner surface allows aperture 28 to be much smaller than has heretofore been possible. The injector and spark plug recesses are formed to fit closely to the components contained therein, the spark plug recess being formed to next the nost of the plug as far as possible, so that the unoccupied volume of the cavity is very small, and any leakage across an apex seal transiting the aperture is minimized.

The nozzle is provided with a plurality of minute orifices 33 (better shown in FIG. 5) through which fuel is sprayed as shown by the schematically indicated jets 34. The number, pattern, size, and angle of discharge of orifices 33 may vary from one engine to another consonant with the fuel requirements of the engine, and according to the positioning of the nozzle upstream or downstream from the cusp, and whether the angle of the injector is such that the nozzle is pointed generally in the upstream, downstream, or axial direction. In any case, however, at least one orifice 33a is so disposed and oriented as to discharge a "light-off" jet 34a through the path of the spark.

A fuel injection pump (not shown) of a conventional type used in fuel metering systems provides the requisite timing, pressure, and quantity of fuel as required for varying engine operation. Injection normally begins as soon as the leading end of rotor recess 24 in the compression zone has passed the housing aperture 28, and may be of short duration during idling, or may continue until the trailing end of the recess reaches aperture 28 for full load operation. The spark is initiated by the distributor of the ignition system, and is ordinarily timed for the beginning of fuel injection, but the timing may be so adjusted that the spark occurs later during the injection period, or may have a duration throughout the process of injection or any portion thereof.

Figure 3:
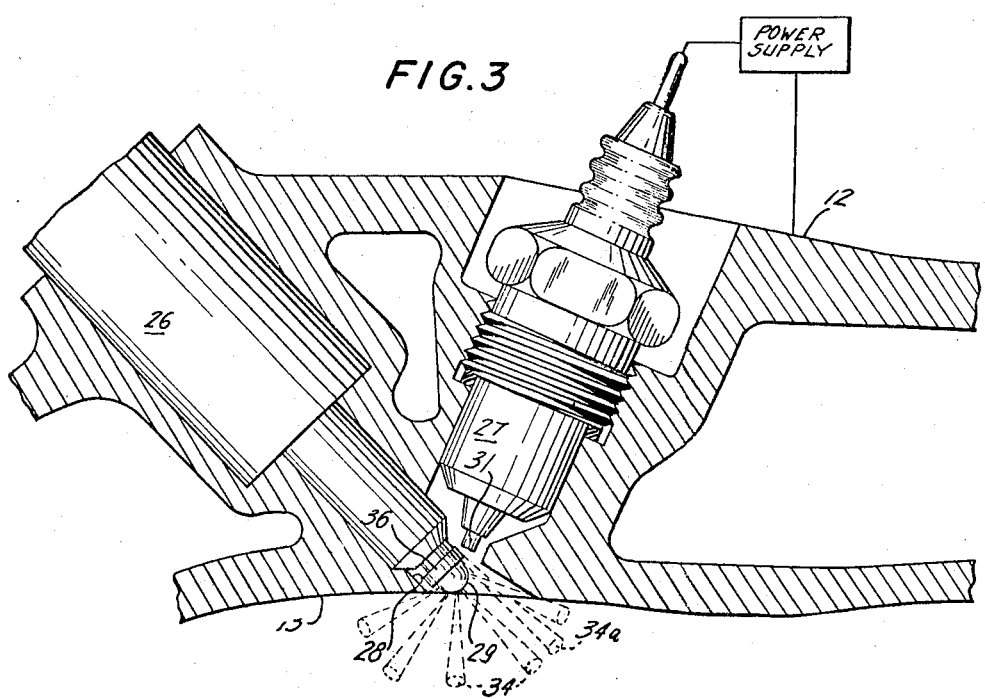
FIG. 3 is a similar view of a modified embodiment.
Figure 4:
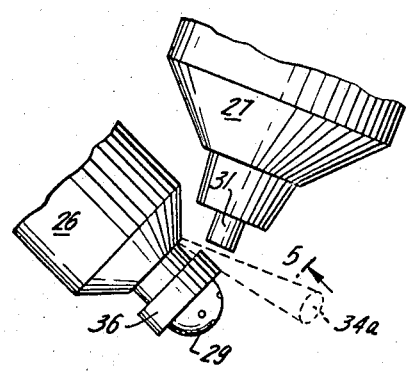
FIG. 4 is a still larger view of a portion of the embodiment shown in FIG. 3.
Figure 5:
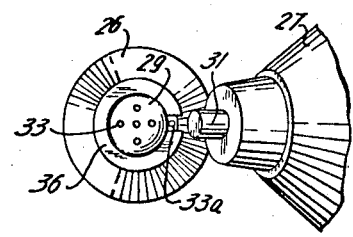
FIG. 5 is a view in the direction of arrows 5—5 of FIG. 4.

FIGS. 3, 4, and 5 show a similar arrangement of the paired injector and spark plug assembly, wherein the nozzle 29 of the injector is surrounded by a ring electrode 36 against which the spark from the plug electrode 31 strikes. The ring 36 is not continuous, but is divided at one point and has a slight interstice between the two ends, and is installed on the nozzle with the interstice immediately adjacent to electrode 31 so that the spark gap is formed between the ring ends and electrode 31. A nozzle orifice 33a is disposed and oriented so as to discharge a light-off fuel jet 34a through the interstice between the ends of the ring, which jet therefore passes through the spark. Ring 36 may be pressed onto the nozzle 29, so that it is removable and replaceable in the event of erosion.

Although each jet of fuel issuing from an individual orifice 33 is in the main a coherent stream, it is surrounded by a sheath of mist which is readily ignited by the spark. In any case, the heat of the spark is sufficient to vaporize enough of the liquid through which it passes to bring about ignition.

Figure 6:
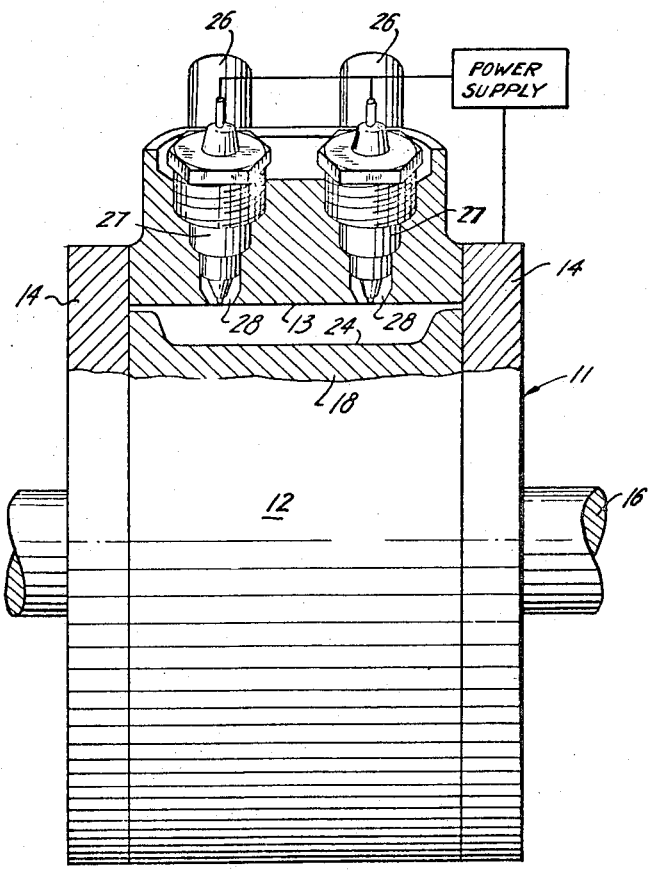
FIG. 6 is a side elevation, partially in section, of an engine with dual ignition according to the invention.

In FIG. 6 there is shown an arrangement suitable for engines wherein the rotor 18 has a greater axial width, particularly for engines of higher power with the same rotor diameter. Two injector and spark plug pairs are disposed side by side in the axial direction in the region of the cusp opposite to the intake and exhaust ports. As in the previous embodiments, the injector and spark plug assemblies may be positioned either at the cusp, or upstream or downstream therefrom.

Figure 7:
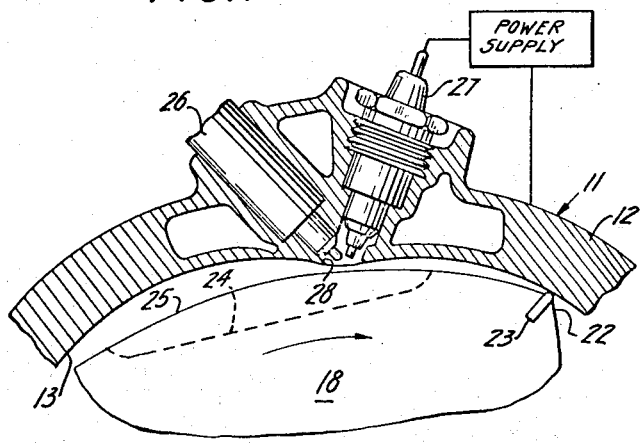
FIG. 7 is a fragmentary view similar to FIG. 1, showing an alternate location for the injection and ignition means.
Figure 8:
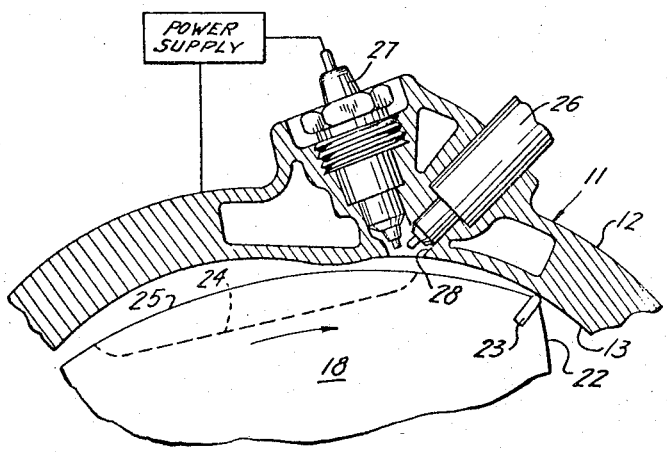
FIG. 8 is a similar view showing a further location.

FIGS. 7 and 8 shown respectively, an injector and spark plug pair positioned at the cusp in the compression zone, and an injector and spark plug pair positioned downstream from the cusp in the compression zone.

Figure 9:
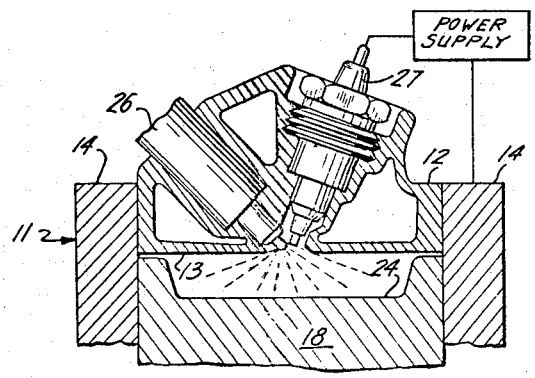
FIG. 9 is a fragmentary view showing another orientation of the fuel injector and ignition means.

Although the engines described have been shown with the injector and spark plug of a given assembly pair aligned in the circumferential direction, it is also contemplated that the members of an assembly pair may be disposed side by side in the axial direction, the orientation of nozzle orifices 33 being selected to produce an adequate spray pattern. FIG. 9 shows such an arrangement, wherein the injector and spark plug pair are disposed at an angle transverse to the direction of rotor rotation, that is, in a plane which includes the axis of the shaft 16. As in the previously described embodiments, the assembly is disposed in the region of the cusp in the compression zone.

What is claimed is:

1. A rotary internal combustion engine having a housing comprising a peripheral wall having a basically epitrochoidal inner surface and a pair of end walls defining an engine cavity and having intake and exhaust ports, a shaft transpiercing the end walls and having an eccentric portion disposed within the engine cavity, a rotor of generally polygonal profile rotatably mounted on the eccentric and having a plurality of apex portions sweeping the inner peripheral surface in sealing relation therewith, the rotor having a plurality of working faces between apex portions, the working faces defining with the housing a plurality of working chambers of variable volume, the rotation of the rotor taking in fresh air at the intake port and compressing it in a zone remote therefrom, wherein the improvement comprises:

a. the peripheral wall having therein at least one pair of intercommunicating recesses, the recesses having a common aperture communicating with the engine cavity in the compression zone;

b. a spark plug disposed in one recess of an intercommunicating pair and a fuel injector disposed in the other recess of the pair, the injector having a nozzle oriented to spray fuel into the compression zone through the aperture communicating with the engine cavity, and the spark plug having an electrode in close proximity to the fuel nozzle and forming a spark gap therewith; and c. an ignition system having one pole connected to the spark plug electrode and the other pole connected to the engine housing so that the electrode and the fuel nozzle are at opposite polarities, the ignition system firing a spark across the spark gap during the period of fuel injection.

2. The combination recited in claim 1, wherein the spray nozzle has a plurality of orifices oriented to direct a plurality of fuel jets in various directions into the compression zone, one of the nozzle orifices being oriented to direct a fuel jet through the path of the spark between the spark plug electrode and the nozzle.

3. The combination recited in claim 2, wherein the spray nozzle has a replaceable ring member surrounding the nozzle, the ring being divided at one portion of its circumference to leave an interstice between the ends, the divided portion being positioned in proximity to the spark plug electrode to form a spark gap between the electrode and the ring ends, and one of the nozzle orifices being oriented to direct a fuel jet through the interstice between the ring ends.

4. The combination recited in claim 2, wherein the inner surface of the peripheral wall forms a plurality of concave lobes with cusps at the lobe junctions, the intake port is disposed in the zone of one cusp and the compression zone is in the zone of another cusp, and at least one fuel injector and spark plug pair are disposed in the region of the compression zone cusp.

5. The combination recited in claim 4, wherein the fuel injector and spark plug pair are disposed upstream from the compression zone cusp with regard to the direction of rotor rotation.

6. The combination recited in claim 4, wherein the fuel injector and spark plug pair are disposed downstream from the compression zone cusp with regard to the direction of rotor rotation.

7. The combination recited in claim 4, wherein the fuel injector and spark plug pair are disposed at the compression zone cusp.

8. The combination recited in claim 2, wherein the fuel injector recess and the spark plug recess of a pair intercommunicate at their inner ends, and their outer ends are angularly spaced apart in the circumferential direction.

9. The combination recited in claim 8, wherein there is a plurality of pairs of fuel injector and spark plug recesses, the pairs being spaced apart in the axial direction.

10. The combination recited in claim 2, wherein the fuel injector recess and the spark plug recess of a pair intercommunicate at their inner ends, and their outer ends are angularly spaced apart in the axial direction.

* * * * *